United States Patent [19]

Boyce

[11] 4,118,775
[45] Oct. 3, 1978

[54] TAXIMETER FARE COMPUTING DEVICES

[75] Inventor: Peter Howard Boyce, Swindon, England

[73] Assignee: Plessey Handel und Investments A.G., Zug, Switzerland

[21] Appl. No.: 778,972

[22] Filed: Mar. 18, 1977

[30] Foreign Application Priority Data

Mar. 18, 1976 [GB] United Kingdom ............... 10859/76

[51] Int. Cl.² ............................................. G07B 13/00
[52] U.S. Cl. .................................................. 364/467
[58] Field of Search ....................... 235/168, 30 R, 45; 364/467

[56] References Cited

U.S. PATENT DOCUMENTS

| 3,860,806 | 1/1975 | Fichter et al. | 235/168 |
| 3,937,933 | 2/1976 | Warkentin | 235/30 R X |
| 4,045,656 | 8/1977 | Scott | 235/30 R X |

Primary Examiner—David H. Malzahn
Attorney, Agent, or Firm—Fleit & Jacobson

[57] ABSTRACT

An indicating device especially in the form of a taximeter comprises a first register for accommodating and storing information relating to distance related pulses received by the device, a second register for storing information relating to the number of distance related pulses that correspond to a predetermined threshold speed that would be received in a predetermined time period, and a third register for storing information relating to an accumulating total, means being provided for comparing the information stored in the first and second registers, preferably at successive time intervals corresponding to the predetermined time period, and for adding the information of one or the other thereof to the information of the third register dependent upon their relative values.

7 Claims, 1 Drawing Figure

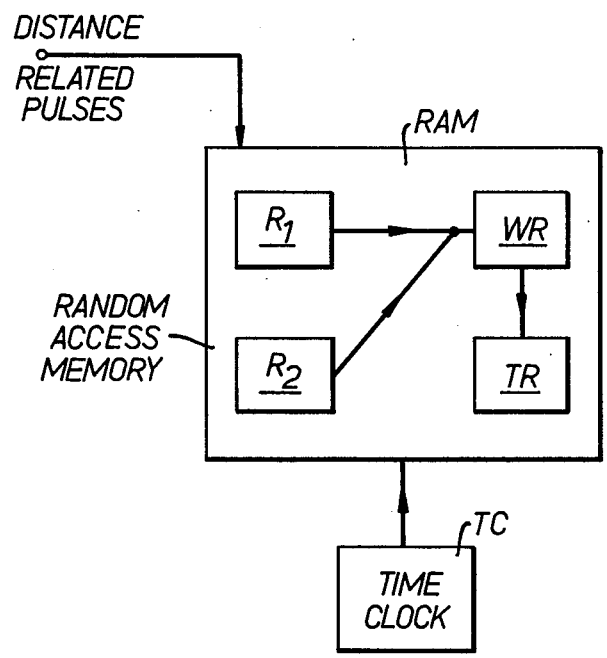

TAXIMETER FARE COMPUTING DEVICES

This invention relates to indicating devices and relates more especially to charge indicating devices such as taximeters.

Taximeters as used in taxis are normally required to compute a fare to be charged in dependence, among other things, upon the distance travelled by the taxi and/or, if the speed of the taxi falls below a predetermined threshold speed, upon the time the taxi is being hired. In some known forms of taximeter it is usual to derive two pulse trains, one pulse train being indicative of the distance travelled by the taxi and the other pulse train being indicative of the time the taxi is being hired, and these two pulse trains are combined using suitable gating techniques in order to carry out the required computation.

In our co-pending U.S. patent application Ser. No. 750,915 there is disclosed an indicating device in the form of a taximeter which makes use of micro-processor techniques for carrying out the required computations, and the present invention relates to an arrangement for determining the distance travelled and/or elapsed time element of the taximeter fare computation that lends itself more readily to such a taximeter than does the aforesaid known arrangement.

According to the present invention there is provided in a charge indicating device especially in the form of a taximeter, computing means for computing a fare to be charged comprising first register means for accomodating and storing information relating to distance related pulses received by said device, second register means for storing information relating to the number of distance related pulses that correspond to a predetermined threshold speed that would be received in a predetermined time period, and third register means for storing information relating to an accumulating total, means being provided for comparing the information stored in the first and second register means, preferably at successive time intervals corresponding to said predetermined time period, and for adding the information of one or the other thereof to the information of the third register means dependent upon their relative values.

In a preferred arrangement for carrying out the invention, the information stored by each of said register means will be in the form of a number, the larger of the numbers stored in the first and second register means being added to the number of the third register means and the number of the first register means being reset to zero at each of the successive time intervals.

In carrying out the invention the first, second and third register means may take the form of separate random access memories or preferably may be constituted by parts of a single random access memory and conveniently a fourth memory or part of a memory may be provided for use as a working register.

The foregoing and other aspects of the invention will now be considered by means of an exemplary embodiment which will be described with reference to the accompanying drawing which is a block schematic diagram of a computing arrangement for use in a taximeter in accordance with the present invention.

It is envisaged that a taximeter in accordance with the present invention, for the purpose of computing the distance travelled/elapsed time aspect of a fare to be charged be carried out by providing a random access memory RAM, preferably of non-volatile form, that is divided into at least four parts. A first part $R_1$ of the RAM is arranged to accumulate information corresponding to the number of distance related pulses applied to the taximeter from a transducer arrangement (not shown) that is associated with some moving part e.g. wheel, gearbox of the taxi to which the taximeter is fitted. The information is in the form of a number which is increased by one each time a further pulse is received. A second part $R_2$ of the RAM is arranged to store a number corresponding to the number of distance related pulses that would be received by the taximeter in a period, say 1 second determined by a time clock TC, when the taxi is travelling at a predetermined threshold speed of say 6 m.p.h. A third WR part of the RAM is provided as a working register and a fourth part provided as a total register TR.

The procedure used is as follows:

Every second the contents of $R_2$ is transferred into the working register WR and the $R_1$ is subtracted from it. If the result is positive i.e. $R_1 < R_2$, the working register WR is set to $R_2$ and if the result is negative the working register WR is set to $R_1$.

The contents of the working register WR is then added to the contents of the total register TR which is used to compute the fare to be charged and the register $R_1$ is reset to zero.

As will be appreciated the random access memory RAM may take any convenient form, but will preferably be non-volatile and instead of different parts of the same memory being used for storing the respective information, it will be clearly understood that separate memories may be used.

What we claim is:

1. In a charge indicating system, a computing device for computing a fare to be charged comprising first register means for accommodating and storing information relating to distance related pulses received by said system, second register means for storing information relating to the number of distance related pulses that correspond to a predetermined threshold speed that would be received in a predetermined time period, third register means for storing information relating to an accumulating total, and working register means operable in conjunction with said first and second register means for comparing the information in said first and second register means and for adding the information of one or the other thereof to the information of the third register means dependent upon their relative values.

2. The charge indicating system of claim 1, wherein said computing device further comprises clock means for operating said working register means at successive time intervals corresponding to said predetermined time period.

3. The charge indicating system of claim 2, wherein in said computing device, the information stored by each of said register means is in the form of a number, the working register means being effective for causing the larger of the members stored in the first and second register means to be added to the number of the third register means and said first register means being operative to cause the number therein to be reset to zero at each of the successive time intervals.

4. The charge indicating system of claim 1, wherein in said computing device, the first, second and third register each take the form of separate random access memories.

5. The charge indicating system of claim 1, wherein in said computing device, the first, second and third register are constituted by parts of a single random access memory.

6. The charge indicating system of claim 1, wherein in said computing device, said working register means comprises a further part of said random access memory.

7. The charge indicating system of claim 1, wherein said system is a taximeter.

* * * * *